FIG. 1
| C IN | A | B | C OUT |
|---|---|---|---|
| 0 | 0 | 1 | 0 |
| 0 | 1 | 0 | 0 |
| 1 | 0 | 1 | 1 |
| 1 | 1 | 0 | 1 |
| 0 | 0 | 0 | 0 |
| 1 | 0 | 0 | 0 |
| 0 | 1 | 1 | 1 |
| 1 | 1 | 1 | 1 |
FIG. 2
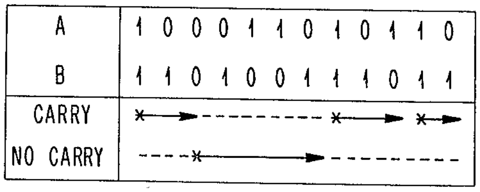
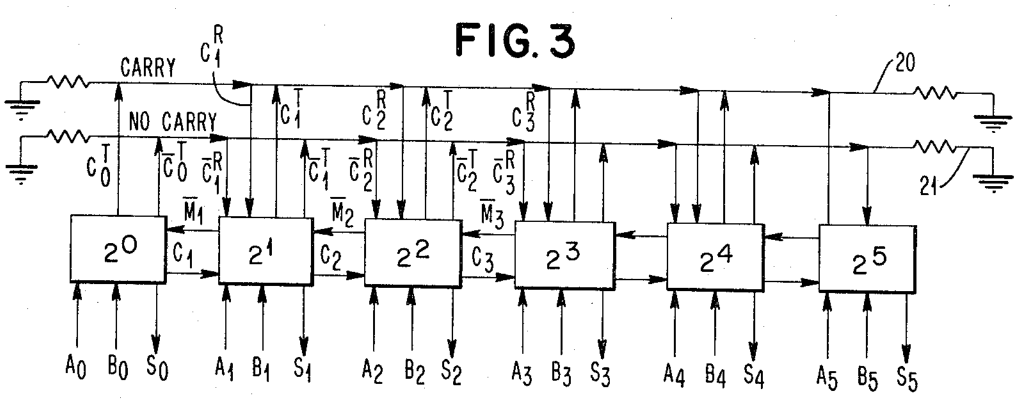
FIG. 3
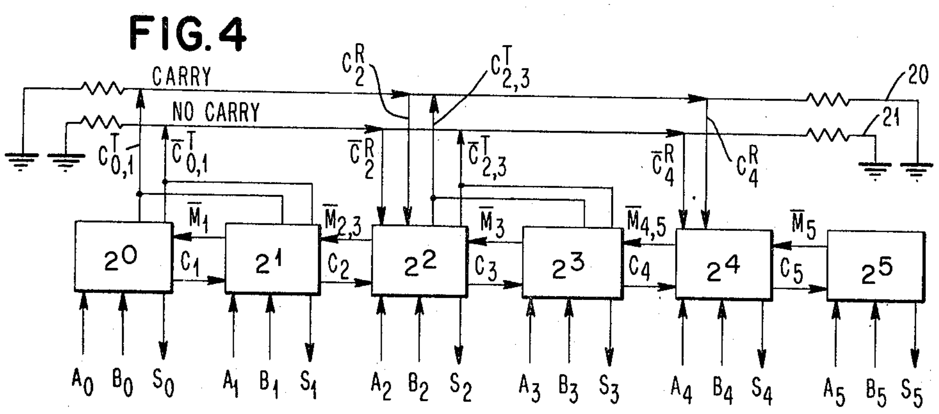
FIG. 4
INVENTORS
MURRAY H. BOLT
HOWARD H. NICK
BY Robert W. Berray
ATTORNEY Feb. 27, 1968 M. H. BOLT ET AL 3,371,195

PARALLEL BINARY ADDER USING TRANSMISSION LINES FOR CARRY HANDLING

Filed Oct. 12, 1965 7 Sheets-Sheet 3

Feb. 27, 1968 M. H. BOLT ET AL 3,371,195

PARALLEL BINARY ADDER USING TRANSMISSION LINES FOR CARRY HANDLING

Filed Oct. 12, 1965 7 Sheets-Sheet 4

Feb. 27, 1968 M. H. BOLT ET AL 3,371,195

PARALLEL BINARY ADDER USING TRANSMISSION LINES FOR CARRY HANDLING

Filed Oct. 12, 1965 7 Sheets-Sheet 7

United States Patent Office 3,371,195

Patented Feb. 27, 1968

3,371,195

PARALLEL BINARY ADDER USING TRANSMISSION LINES FOR CARRY HANDLING

Murray H. Bolt, Poughkeepsie, and Howard H. Nick, Wappingers Falls, N.Y., assignors to International Business Machines Corporation, Armonk, N.Y., a corporation of New York Filed Oct. 12, 1965, Ser. No. 495,289

8 Claims. (Cl. 235—175)

This invention relates to parallel binary adders and more particularly to parallel binary adders wherein the transmission of carries from low order stages to high order stages is accomplished through the use of transmission lines.

The speed of any binary data processing system is a function of the speed in which a plurality of binary bits can be added in a parallel binary adder. One factor in the speed of a parallel binary adder is the number of binary logic stages required to generate one sum bit for the corresponding bits of operands to be added. Six binary logical stages are usually required in parallel adders to generate a sum bit based on carry information generated from a low order stage and transmitted to a higher order stage when required. The speed of the parallel adder is then also affected by the speed of the electronic circuit family utilized to build the logic stages.

A primary concern in developing parallel binary adders in order to increase the speed of operation of the adder, is the handling of carry information from low order binary stages to higher order binary stages. A brief summary of some techniques utilized for handling carries in parallel binary adders can be found in an article entitled High-Speed Arithmetic in Binary Computers by O. L. MacSorley in Proceedings of the IRE, vol. 49, No. 1, pg. 67. Two of the basic techniques for carry handling described in the above cited article include ripple carry adders in which a carry out of a low order binary stage of the adder must ripple through or be propagated through succeeding high order stages. A worst case situation arises when a carry out of the lowest order position of the adder must be propagated through all succeeding higher order stages of the adder. Therefore, the over-all speed of the data processing system when called upon to add two binary numbers becomes a function of the number of stages in the adder to perform the basic add function and the time required for the binary logic circuitry to propagate the carry from the low order stages to the high order stage. Another basic technique for carry handling is described wherein full carry look-ahead is utilized. This type of parallel binary adder requires a great deal of additional logic circuitry to inform the highest order binary position of the adder of the carry information being generated in all lower order binary positions such that the sum can be developed in the highest order stage of the adder simultaneously with the sum of all lower order stages.

On page 71 of the above-mentioned article, there is shown a type of adder called a Completion Recognition Adder. In this type of adder, either of two carry signals can be produced in each stage of the parallel binary adder. Each stage of the adder will be capable of generating on either of two lines a signal representing a carry transmit from the adder or a no-carry signal. A carry and a no-carry path is provided for the length of the adder. The primary concern with this type of adder is with recognizing when all stages of the parallel binary adder have either generated a carry transmit signal (when both binary bits of the operand are binary 1) or has generated a no-carry signal (when the corresponding bits of the operand are both 0's) or when a particular stage which is neither of the preceding has received a carry-in and propagated a carry-out. It has been determined that for a 100-bit parallel binary adder, the need for propagating carries through stages appears to average out to approximately 6 stages such that the recognition of a completed add operation will be detected after the time required for a carry to propagate through 6 stages.

It will be noticed in the figure depicting the completion recognition adder in the cited article, that the generation of signals on either the carry or the no-carry line for the entire length of the adder requires two binary logic decision blocks for each stage of the parallel adder. Again, in a worst case situation, a carry required to be propagated through the entire length of the adder will require a time equal to the number of stages in the adder multiplied by 2, representing the two logical decisions with regard to carries which must be made for each stage.

It is a primary object of this invention to provide a parallel binary adder of the completion recognition type wherein the generation of carry and no-carry signals is accomplished without requiring binary logical decision circuits in the carry and no-carry paths.

It is also an object of this invention to provide a parallel binary adder with a speed capability approaching that of a full carry look-ahead adder but requiring a significantly lesser number of binary logical decision elements.

It is also an object of this invention to provide a parallel binary adder wherein the time required to transmit a carry from a low order stage to a higher order stage is only a function of the physical distance separating the stages.

An additional object of this invention is to provide a parallel binary adder which can be modular in form permitting the addition or deletion of plural bit sections without affecting the basic time required to complete an add operation in a single section.

An additional object of the invention is to provide a parallel binary adder comprised of a plurality of sections, each section having a plurality of binary bits wherein the add time for the adder is a function of 7 binary decision elements for each stage of the adder plus the physical distance separating the lowest order stage of the section from the highest order stage of the section.

A further object of this invention is to provide a parallel binary adder comprised of a plurality of plural bit sections wherein a carry out of a particular section will be a function of propagation time and simultaneously effective at each higher order adder stage to generate a final sum out of the adder.

These and other objects, features and advantages of the subject invention are realized in a basic embodiment thereof wherein there is provided for each stage of a parallel binary adder means to generate function signals indicative of corresponding binary bits from the two operands to be added, signalling the states of 1–1, 0–0, 1–0. These function signals, simultaneously generated for each stage of the adder, are utilized to control the transmission of signals on two transmission lines in a direction toward higher order stages of the adder indicative of a carry (1–1) or no-carry (0–0). These carry and no-carry signals simultaneously generated toward higher order stages of the adder are detected by each stage of the adder as the signals are physically propagated along the length of the adder. Means are provided in each stage of the parallel adder, with the exception of the first stage associated with the length of transmission lines, for detecting and indicating whether the first pulse detected by the stage was on the carry signalling line or the no-carry signalling line. In response to the first detected and indicated signal and the function signals originally generated by the stage, a sum bit is generated for the stage.

There is also provided in the invention means by which the parallel adder can be comprised of a plurality of sections, each section having a plurality of binary stages and a length of transmission line wherein a carry out of a particular section can be simultaneously applied to the means for generating the final sum of all higher order sections of the adder.

Because physical distance between stages of the parallel binary adder becomes a factor in the invention, modifications to the invention are made wherein a particular stage of the binary adder is capable of controlling the generation of carry or no-carry signals from a preceding lower order stage. Since a particular stage can be affected in the generation of carries by a next succeeding higher order stage, an alternate path is provided between adjacent stages for the transmission of carry signals.

One additional modification to the inventive concept is the ability to make the transmission of each carry and no-carry signal to higher order stages of the adder dependent on more than 1 binary bit from each of the operands to be added.

The foregoing and other objects, features and advantages of the invention will be apparent from the following more particular description of preferred embodiments of the invention, as illustrated in the accompanying drawings.

In the drawings:

FIGURE 1 is a table representing the correspondence between the binary value of two operands to be added, a carry into a particular binary stage and the carry out of that stage.

FIGURE 2 is a table representing the concept of a completion recognition adder in the generation of carry information.

FIGURE 3 is a schematic representation of a plural-bit parallel binary adder showing the use of transmission lines to transmit carry and no-carry information from low order stages to higher order stages.

FIGURE 4 is a schematic representation of a plural-bit parallel binary adder wherein the transmission of carry and no-carry signals to higher order stages is made dependent on more than one bit from the two operands to be added.

Figure 5A:
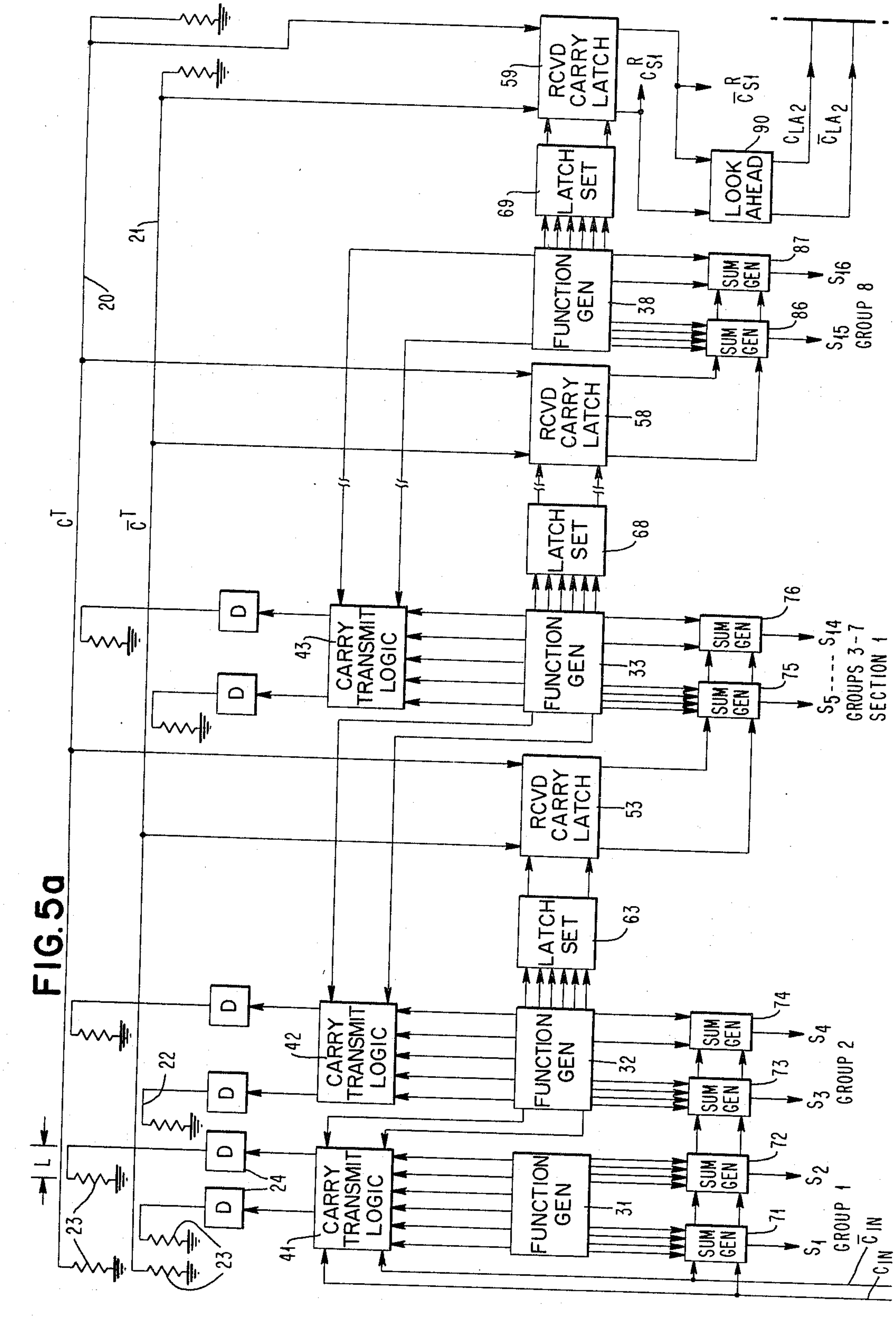
Figure 5B:
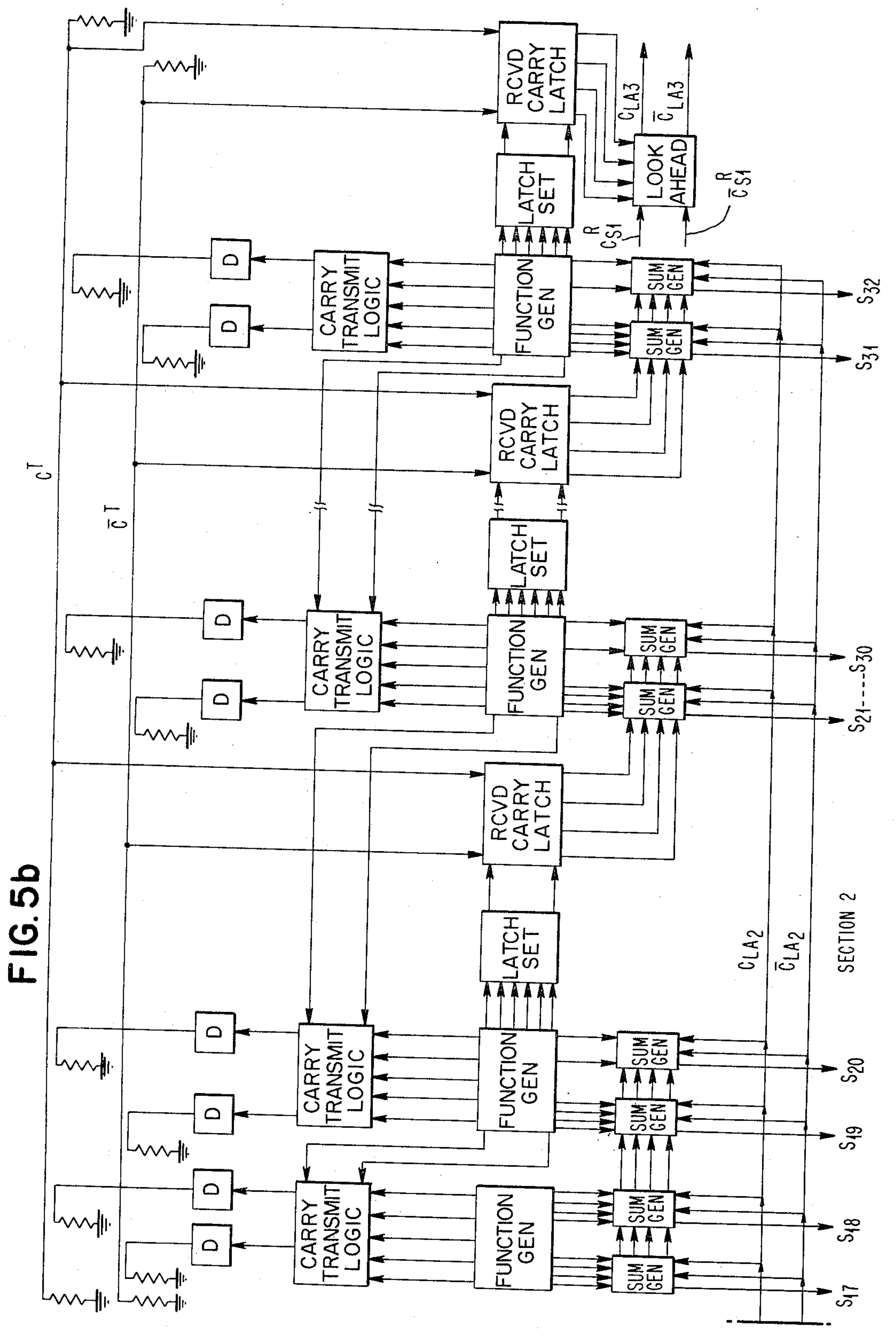

FIGURES 5*a* and 5*b* are a block diagram of a preferred embodiment of this invention showing major blocks for transmitting carry information on two transmission lines and detecting this information for the generation of a sum for each stage of a plural-section parallel binary adder.

Figure 6A:
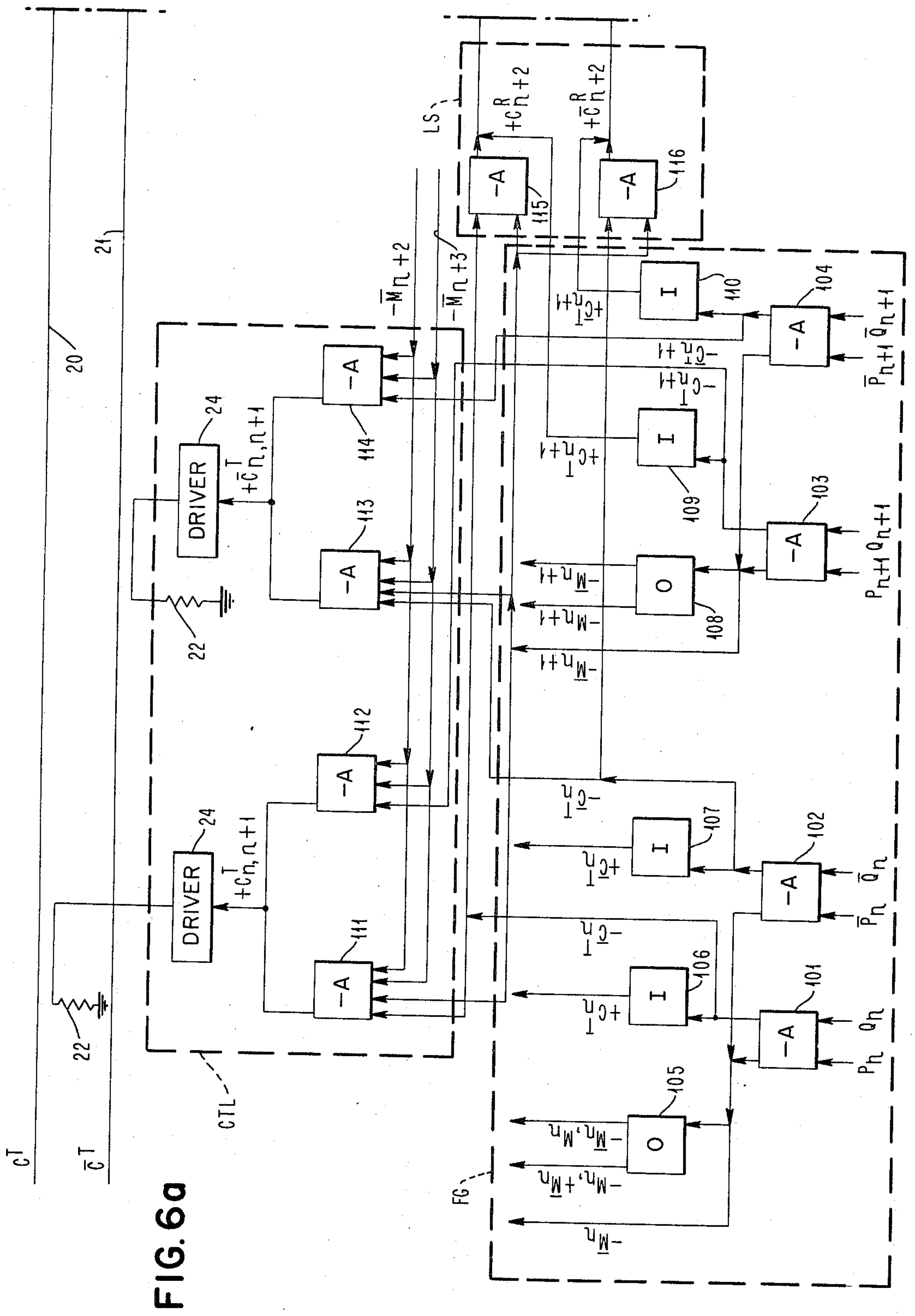
Figure 6B:
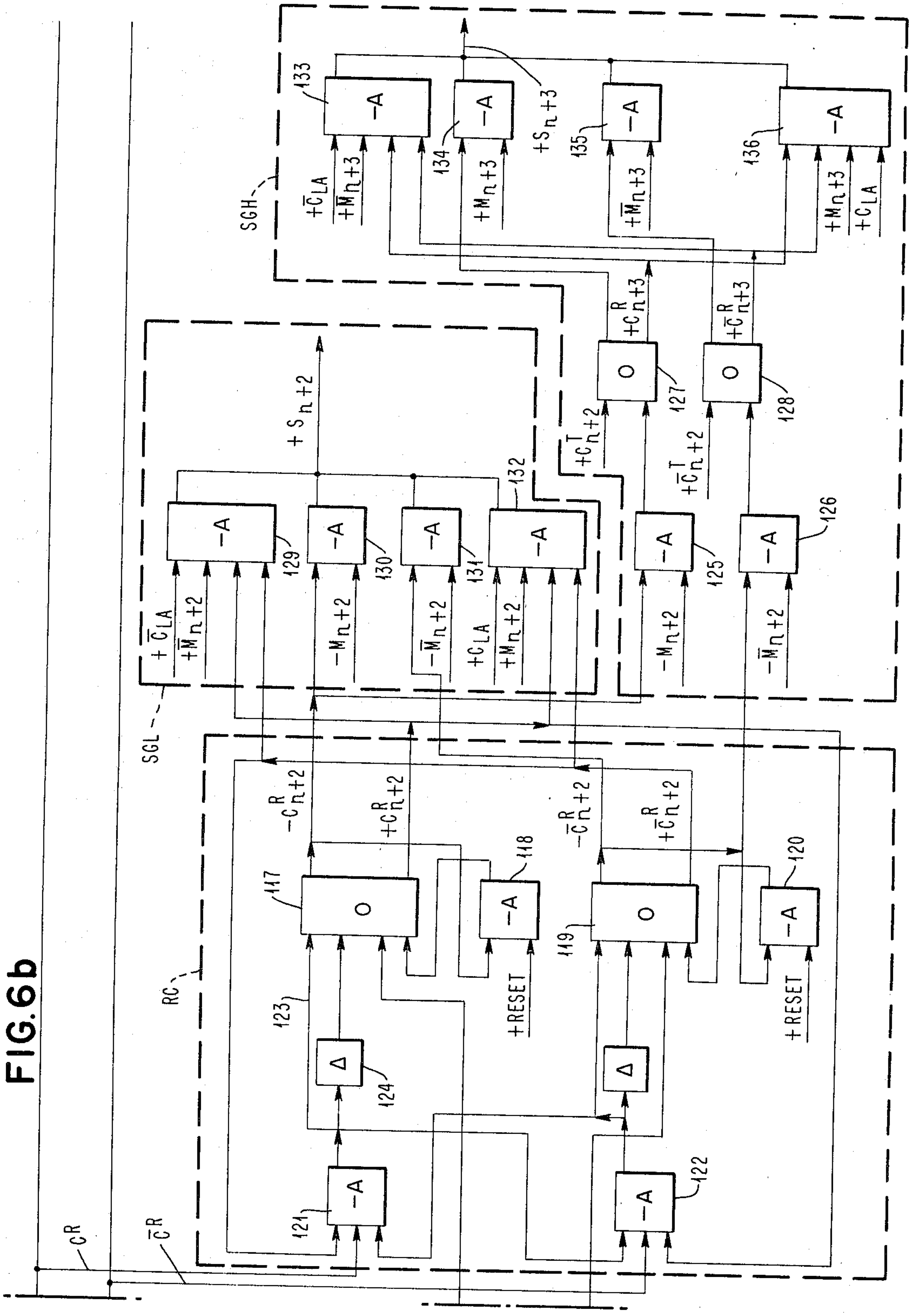

FIGURES 6*a* and 6*b* are a logic block diagram showing portions of four adjacent stages of a binary adder including details of each of major blocks shown in FIGURE 5*a*.

Figure 7:
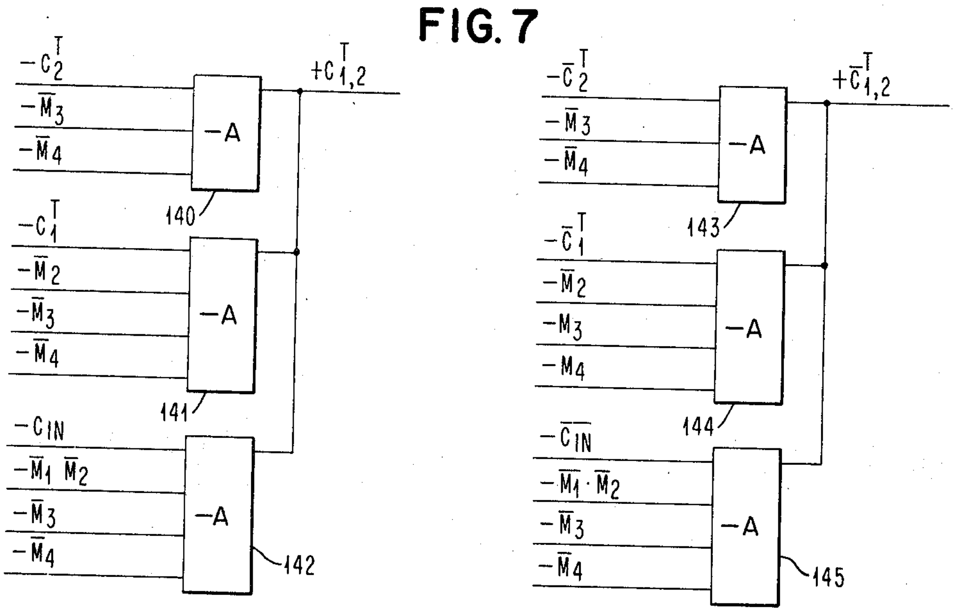

FIGURE 7 is a logic block diagram showing the transmission of carry and no-carry signals by the lowest order stage of a parallel binary adder in response to carry-in signals to the adder.

Figure 8:
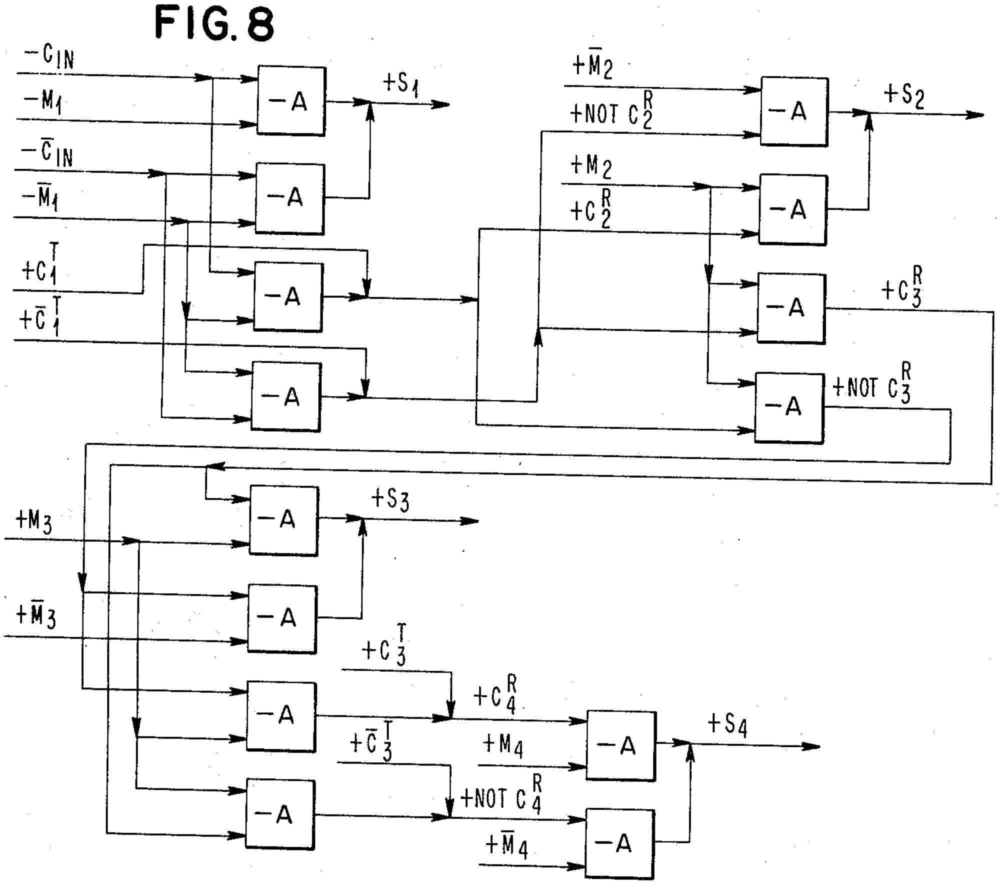

FIGURE 8 is a logic block diagram showing the necessary logic for generating the final sum bits of the four lowest order stages of a parallel binary adder in accordance with the preferred embodiment of the present invention shown in FIGURES 5*a* and 5*b*.

Figure 9:
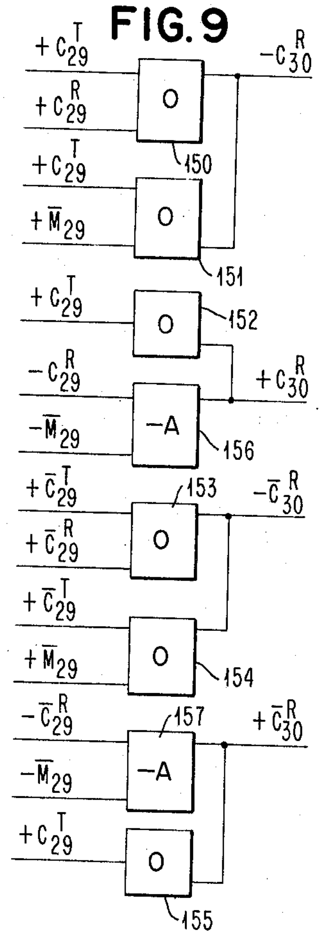

FIGURE 9 is a logic block diagram showing a modification to carry detecting means in certain stages of the adder.

Figure 10:
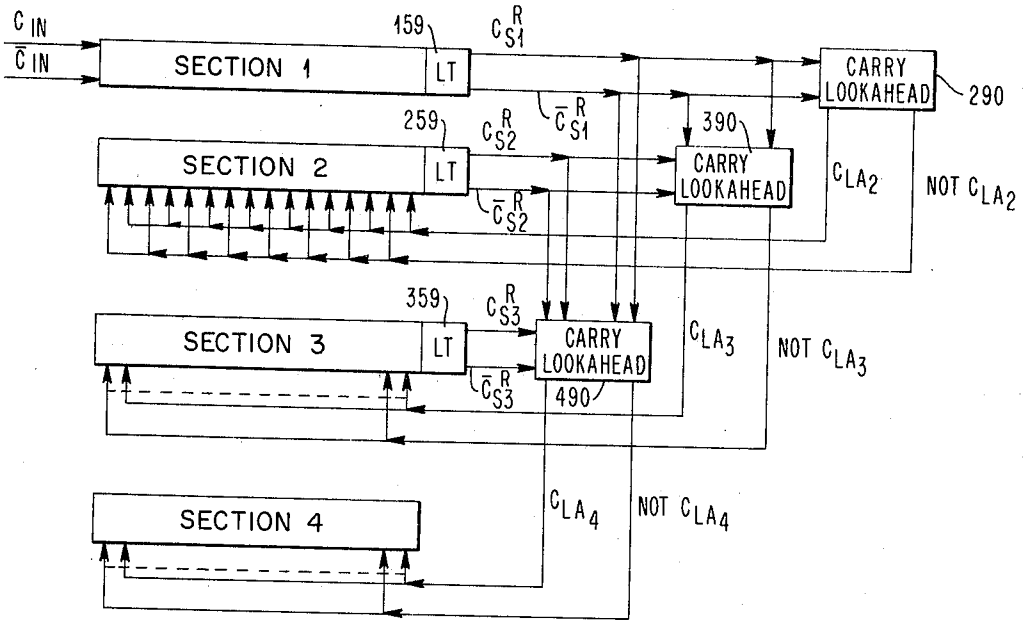

FIGURE 10 is a block diagram showing the interconnection of a plurality of plural-bit sections built in accordance with the present invention to achieve carry look-ahead between sections.

Figure 11:
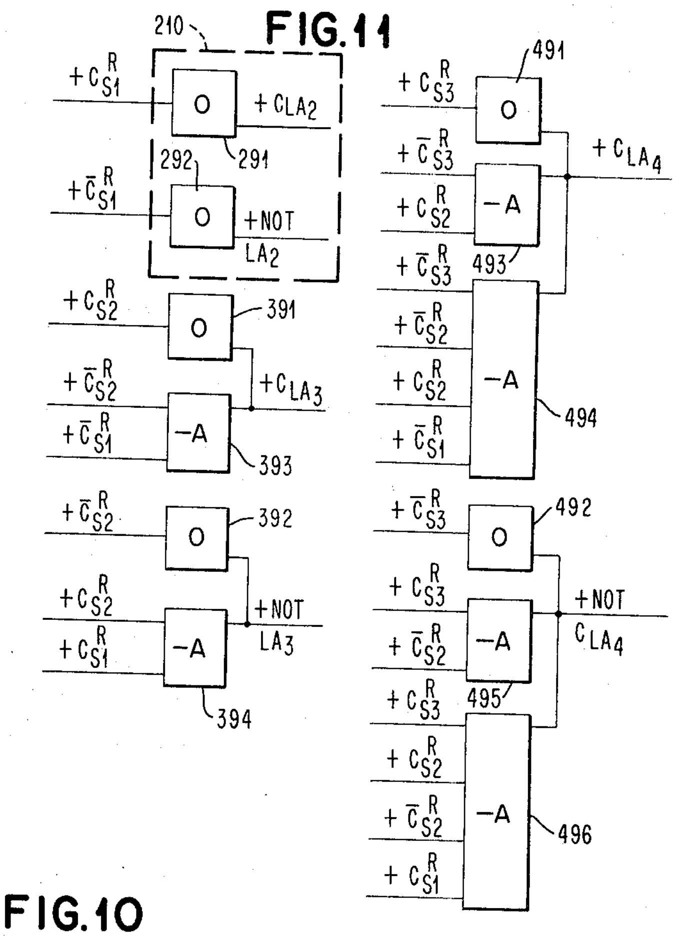

FIGURE 11 shows logic required for generating carry look-ahead information in a 4-section parallel binary adder.

FIGURES 1 through 4 will be utilized to generally describe the concepts involved in the present invention including various modifications which result in a preferred embodiment of the invention to be more fully described later. FIGURE 1 is a table showing the 8 possible carry out signals (C out) of a particular adder stage as a function of the two binary bits of the operands A and B, and a carry into the stage (C in). The upper half of the table shows that C out of a particular adder stage will be a function of, and identical to, C in to the stage when the binary values of the two operands are different. The lower half of the table shows that when the binary value of the two operands is the same for a particular adder stage, the C out of the stage is entirely a function of the value of the operands and independent of C in to the stage.

In the descriptions which follow, the parallel binary adder will have the lowest order binary position at the left and the highest order position at the right with the generation and transmission of carries from left to right to succeedingly higher order stages.

FIGURE 2 is a representation of how the concept shown in FIGURE 1 can be utilized in a completion recognition adder wherein for a particular binary adder stage which has the corresponding binary bits the same, a carry or no-carry signal is immediately generated. For those stages in which the binary value of the two binary bits is different, the output carry out from the stage will be the same as the carry into the stage. In the lower half of the table in FIGURE 2, the generation of carries and no-carries from stages is indicated with an asterisk.

An examination of FIGURE 2 reveals certain information concerning the handling of carries on two separate lines. Any binary stage of an adder in which both operands have the binary value 0 can inform stages of higher order that when a no-carry signal is received, no further carry information can possibly affect the sum for these higher order stages. The no-carry signal transmitted by a stage indicates that the stage is not generating a carry of its own nor can it possibly propagate a carry from some lower order stage. Also, when the binary value of the two operands applied to a stage is binary 1, stages of a higher order can immediately utilize the carry signal to generate the final sum recognizing that the lower order stage also cannot possibly propagate a carry from some lower order stage. For a series of stages in the binary adder having unlike binary values applied to the stage, the carry out from the stage, whether a carry signal or a no-carry signal, will be the same as the carry in. Utilizing the logic of the completion recognition adder, any stage of the adder can recognize that as soon as it receives either a carry or a no-carry signal, it has received all of the carry information to be expected and can immediately generate a sum value.

FIGURE 3 depicts schematically 6 stages of a parallel binary adder wherein the carry and no-carry information is to be transmitted from low order stages to higher order stages simultaneously on two transmission lines 20 and 21 respectively. The advantage of the present invention can be readily seen at this point when FIGURE 3 is compared with the description of the completion recognition adder in the above-cited MacSorley article. If the carry and no-carry information can be generated and transmitted from low order stages to high order stages on the transmission lines 20 and 21 and be detected in the binary stages for generating a final sum, without requiring the two logic elements on each of the carry and no-carry lines for each stage of the binary adder, the time delay caused by these logic elements can be eliminated. In a worst case situation, wherein a carry or no-carry signal must be transmitted from the lowest binary position to the highest binary position, the time involved is only the physical distance separating these two stages along the transmission line. Each stage of the binary adder, with the exception of the highest order stage, has associated therewith means in the form of directional couplers, to be more fully described, capable of coupling to the transmission line pulses to be propagated toward the higher order end of the adder. The pulses directionally coupled onto the transmission lines for a particular stage, such a stage $2^0$, will be a transmitted carry signal ($C^T_0$) or a transmitted no-carry signal ($\bar{C}^T_0$). This carry and no-carry signal information will be generated as a function of corresponding binary bits $A_0$ through $A_5$ and $B_0$ through $B_5$ applied to each of the stages $2^0$ through $2^5$.

Each of the stages of the adder depicted in FIGURE 3, when the corresponding binary bits so indicate, will simultaneously transmit the carry $C^T$ and no-carry $\bar{C}^T$ pulses onto the transmission lines 20 and 21 to be propagated toward the higher order end of the parallel adder. Each stage of the adder, with the exception of the lowest order stage, will have means for detecting the presence of pulses being propagated along the transmission lines. The detection means will be more fully described, but are depicted in FIGURE 3, with regard to stage $2^1$ for example, as means for receiving signals on either one of two lines, labeled Received Carry ($C^R_1$) or a Received No-Carry signal ($\bar{C}^R_1$). It will be the function of the detection circuitry to detect and indicate the first to be received of the signals propagating from lower stages along the transmission lines 20 or 21. The need for detecting the first to be received of the pulses and inhibiting any action of a following pulse can be seen in connection with FIGURE 2 wherein it can be seen that certain stages of the parallel binary adder will first receive a no-carry signal being propagated from a low order stage, and then will receive a carry signal being generated from a lower order stage of the adder. Each stage therefore must be capable of recognizing the first to be received of these pulses on either transmission line and eliminate any effect of a following pulse on either transmission line.

A modification to the basic philosophy of the invention previously described is shown in FIGURE 3. Since physical distances along the transmission line become a factor in the design of the adder, and since the speed at which the logic circuitry can respond is also a factor, it becomes important to insure that pulses being simultaneously propagated down the transmission lines 20 and 21 are separated by a distance, and therefore time, sufficient to permit the recognition of the first to be received of a signal on either transmission line and reject the next following pulse on the transmission line. The physical separation of the directional couplers and adjacent stages of the parallel adder can be reduced and yet maintain the minimum separation between pulses on the lines by a modification of the basic principles. Two additional lines, not yet disclosed, are shown in FIGURE 3. One of these lines between adjacent stages is labeled $\bar{M}_1$, $\bar{M}_2$, etc. The other line is labeled $C_1$, $C_2$, etc. If, for example, stage $2^1$ is to transmit either a carry $C^T_1$ or no-carry $\bar{C}^T_1$ signal, any carry or no-carry information from stage $2^0$ will be of no value to higher order stages of the parallel adder. Therefore, it will be the function of a particular stage of the adder to indicate to a next preceding lower order stage whether or not the particular stage will be transmitting carry information. This information from a particular stage will be designated $\bar{M}_1$, for example, which indicates that the stage will not be transmitting carry information. The line labeled $\bar{M}_1$, $\bar{M}_2$, etc. is a line signalling a next lower order stage that no carry information is to be transmitted by the stage, therefore, if the lower order stage has received corresponding binary bits for transmitting carry information this information will be transmitted. Otherwise, a stage which is transmitting carry information will inhibit the transmission of any carry information from the next lower order stage.

If a particular stage does inhibit the operation of the transmission of carry information onto the lines 20 or 21 from a next lower order stage, an alternate carry path is provided between the adjacent stages. This information is designated in FIGURE 3 as $C_1$, $C_2$, etc. which is the alternate carry path between adjacent stages when a higher order stage inhibits the operation of the transmitting of carry information from a lower order stage. In this manner, higher order stages of the parallel binary adder will not be required to detect pulse information on the transmission lines 20 or 21 from adjacent lower order stages of the parallel adder.

FIGURE 4 depicts in block diagram form and schematically a further modification to the preceding descriptions, and represents a preferred embodiment of the present invention. In this embodiment, a further reduction can be made in the length of the transmission line and the separation between directional couplers and still produce a minimum separation of pulses on the transmission lines capable of being detected by the circuit family involved. In this embodiment, more than one binary bit from each of the operands $A_0$ through $A_5$ and $B_0$ through $B_5$ are combined so that each directional coupler will be transmitting carry information onto the transmission lines 20 or 21 from two adjacent binary stages. As indicated previously in connection with the modifications described in FIGURE 3, an inhibiting action and an alternate carry path are provided between the two adjacent stages which form the two-bit group. Therefore, if the highest order stage of the pair of bits is transmitting carry or no-carry information the lowest order bit of the pair will be inhibited from transmitting carry information. As a further extension of this, the inhibiting action and alternate carry path are also provided between two adjacent bit pairs in the parallel adder. For example, if either the $2^2$ or $2^3$ stage transmits carry or no-carry information, the transmission of carry or no-carry information from the immediately preceding lower order bit pair will be inhibited. Therefore, an alternate carry path must also be provided between two adjacent bit pair groups. As will be more fully described, carry information from the transmission lines is applied to the lowest order stage of a bit-pair. Therefore, carry information to the highest order stage of the pair will always be a function of the carry received from the transmission lines and the function signals produced by the lowest order stage of the pair.

FIGURE 5*a* will be utilized to discuss the major functional units of a parallel binary adder made in accordance with a preferred embodiment of the invention. FIGURE 5*b* has been shown primarily for the purpose of describing the operation of the carry look-ahead concept.

In FIGURE 5*a* there are shown schematically directional couplers 22 utilized for transmitting carry and no-carry information in a predetermined direction, namely from left to right or toward the higher order end of the parallel adder on two transmission lines 20 and 21. As depicted, a directional coupler is a length L of transmission line placed adjacent and parallel to the larger transmission lines 20 or 21. If each of the transmission lines 20 and 21 is terminated in its characteristic impedance 23, and one end of each directional coupler is also terminated in this characteristic impedance 23, the application of a change in voltage to the other end of the directional coupler, will produce on the transmission lines 20 or 21 a pulse having a width proportional to the length L of the coupling. Terminating the directional coupler at the left of the coupling, couples pulses to the transmission lines 20 or 21 which will be propagated from left to right toward the higher order end of the parallel adder. Associated with each of the directional couplers 22 are drivers 24 which will respond to logic to produce the change in voltage to transmit the pulses of a predetermined length toward the higher order end of the adder.

In a preferred embodiment of the invention, as shown in FIGURES 5*a* and 5*b*, a parallel binary adder will be made up of a plurality of sections, each section including 16 binary bits of two operands to be added. Each section is further comprised of 8 groups of binary bits, each group being comprised of 2 binary bits from each of the operands to be added. The major functional blocks of the two-bit groups 1, 2, 3 and 8 have been shown fully.

As indicated in FIGURE 5*a*, groups 4 through 7 will be identical to group 3. The numbering of the blocks has been made consistent with the group numbers. The major functional component of each section, to be more fully described, includes Function Generators 31 through 38 which receive, from registers within the data processing system, the value of 2 binary bits from each of the operands to be added to produce a plurality of function signals. These function signals include a first signal representative of a carry $C^T(1, 1)$, a second signal representative of a no-carry $\overline{C}^T(0, 0)$, and a third signal indicating the absence of either the first or second signal $\overline{M}(1, 0)$.

As mentioned previously, each section will also include two lengths of transmission line 20 and 21 which will be responsive to directional couplers 22 for propagating carry or no-carry signals toward the higher order end of the adder. The transmission of carry or no-carry information by drivers 24 and couplers 22 will be controlled by Carry Transmitting Logic 41 through 47, There is no carry transmission logic for the highest order group 8 of each section. The carry transmitting logic will be responsive to the first or second function signals from the corresponding function generator and, in accordance with a preferred embodiment of the invention, will also be responsive and dependent upon, the presence or absence of the third function signal from a succeeding higher order function generator. As shown in FIGURE 5*a*, which represents the lowest order section of a plural section binary adder, the carry transmitting logic associated with the lowest order group of the section will also be responsive to signals C in and $\overline{C}$ in representing carry information into the lowest order position of the adder from some previous system operation.

Also included in each section of the parallel adder are a plurality of Received Carry Latch means 53 through 58. Carry information between the two lowest order groups is handled in a straight-forward manner, not utilizing the transmission lines. The Received Carry Latch means 53 through 58 will be responsive to and indicate the first to be received of a signal on either the transmission lines 20 or 21 representing a received carry signal $C^R$ or a received no-carry signal $\overline{C}^R$ from lower order groups. Associated with each of the Received Carry Latch means 53 through 58, is an additional carry signalling means, Latch Sets 63 through 68. The Latch Sets 63 through 68 will be operative to provide an alternate carry path from a low order function generator to a next succeeding higher order received carry latch whenever the function generator associated with the received carry latch means has prevented an immediately preceding lower order carry transmission logic from transmitting carry information on to the transmission lines 20 or 21.

Also associated with each of the Function Generators 31 through 38, are a plurality of Sum Generators 71 through 87 corresponding to each of the 16 bit positions being added in the section of the parallel adder. The Sum Generators 71 through 87 are responsive to the function signals generated in the Function Generators 31 through 38, and received carry information, either received from the Received Carry Latch means 53 through 58 or from the adjacent lower order bit position of the pair of bits. An exception to this is in connection with the first 4 bit positions of each of the sections wherein received carry latch means between function generators 31 and 32 is not required. Therefore, carry information between Sum Generator 72 and Sum Generator 73 is provided by a direct connection. This modification in the normal inter-connection of carry information between stages is permissible due to timing considerations involved in the section plus the fact that the lowest order bit position of the adder, associated with sum generator 71, must also accommodate a carry in C or no-carry in $\overline{C}$ signal from the data processing system in developing sum information for the first 4 bit positions of the adder.

As shown in FIGURE 5*a*, when more than one section is utilized to build a parallel binary adder, additional carry handling apparatus is required to signal carry information to following sections of the adder. Therefore, associated with each of the sections, with exception of the highest order section of the adder, there will be provided one additional Received Carry Latch means 59 and additional Latch Set 69 for indicating the presence of Carry $$C^R_{S1} \text{ or no-carry } \overline{C}^R_{S1}$$

out of Section 1. In response to the output of Received Carry Latch 59 carry look-ahead information will be generated in Look-Ahead logic 90. The Look-Ahead logic 90 will produce carry look-ahead CLA2 or no-carry look-ahead $\overline{C}$LA2 to the next higher order section, such as Section 2 shown in FIGURE 5*b*. FIGURE 5*b* has the same major functional units as described in connection with 5*a*. The Look-Ahead logic 90 outputs are applied directly and simultaneously to the sum generating logic of the section depicted in 5*b*. The Carry $$C^R_{S1} \text{ or no-carry } \overline{C}^R_{S1}$$

signals out of Section 1 generated by the Received Carry Latch 59 are also applied to look-ahead logic of any other higher order sections of the adder. In this manner, the carry look-ahead or no-carry look-ahead information applied to higher order sections of the adder will be available essentially at the same time, such that the sum information produced by each of the plurality of sections will be available simultaneously. The over-all logic of carry look-ahead will be discussed later.

In FIGURES 6*a* and 6*b* there is shown a logic diagram including a description of the functional blocks shown in FIGURE 5. In FIGURE 6*a* there is shown the function generator and carry transmission logic for a pair of bits $P_n$, $Q_n$, and $P_{n+1}$ and $Q_{n+1}$ and the logic for transmitting the carry signal $$(C^T_{n,n+1})$$

and no-carry signal $$(\overline{C}^T_{n,n+1})$$

Also shown is the alternate carry path in the form of a latch set. The function generator is enclosed in a dotted area labeled FG, the carry transmission logic is shown in a dotted area labeled CTL, and the alternate carry path in the form of a latch set is shown enclosed in a dotted area labeled LS.

In FIGURE 6*b*, there is shown an extension of the same transmission lines 20 and 21 from FIGURE 6*a* and the output of the latch set LS from FIGURE 6*a*. Enclosed within the dotted area labeled RC is the received carry signalling means associated with the bit pair $n+2$ and $n+3$, or the next highest order adder stages from those shown in FIGURE 6*a*. Also shown in FIGURE 6*b* is the sum generator for the lowest order bit ($n+2$) of the bit pair enclosed in the dotted area labeled SGL, and the sum generator for the highest order of the bit pair ($n+3$) within the dotted area labeled SGH.

Throughout the remainder of the description using binary logic, only three different logic blocks are shown. One of these is an AND logic block designated by —A. All inputs to this logic block must be at a negative level in order to satisfy the AND condition. When the AND condition is satisfied, a positive output will be generated from the upper or left-most output. Also utilized is an OR circuit, labeled O, in which if any of the inputs are positive, a positive output will be generated from the lower or right-most output and a negative output will be generated from the upper or left-most output. Also utilized is an inverter circut labeled I, in which the level of the input is reversed at the output.

Certain outputs and inputs of various circuits shown in FIGURES 6*a* and 6*b* have already been discussed and include function signals from the function generator labeled $C^T$, $\overline{C}^T$, and $\overline{M}$. One additional signal is designated M. This signals that the corresponding bits of the two operands are the same (1, 1 or 0, 0). The signal labeled $\overline{M}$ indicates that the bits are different (1, 0). The same function signals are generated for the stages $n$, $n+1$, $n+2$ and $n+3$. The nomenclature utilized for transmitted carry signal lines is $$C^T_{n,n+1} \text{ and } \overline{C}^T_{n,n+1}$$

representative of a carry signal to be placed on transmission line 20 and a no-carry signal to be placed on transmission line 21 based on the binary values from bit positions $n$ and $n+1$. The designation $$C^R_{n+2} \text{ or } \overline{C}^R_{n+2}$$

is utilized to designate received carries or received no-carry signals, by adder stage $n+2$ for example, either from the transmission lines 20 or 21 respectively or from the latch set circuit LS. As indicated previously, with respect to the generation of a sum for the highest order bit of a pair of bits, the received carry or received no-carry signals are generated by logic interconnecting the two binary positions. For example, in connection with FIGURE 6*b*, there is also generated $$C^R_{n+3} \text{ and } \overline{C}^R_{n+3}$$

from signals generated by the function generator for position $n+2$ and the received carry $$C^R_{n+2} \text{ or received no-carry } \overline{C}^R_{n+2}$$

signals for position $n+2$. Also shown is the final output from the sum generators labeled $S_{n+2}$ and $S_{n+3}$ which is a function of the received carry or received no-carry signals, the function generator associated with the $n+2$ or $n+3$ position and any carry look-ahead signals received from lower order sections of the parallel adder.

Each of the function generators FG in the adder will receive the binary value of two adjacent bits from the two operands to be added. The operands are stored in two data processing system registers not shown. The true and complementary outputs of these registers are applied to AND circuits 101, 102, 103 and 104. In connection with adder stage $n$, AND circuit 101 will produce a negative output labeled $$C^T_n$$

when the value of both binary bits is binary 1. AND circuit 102 will produce a negative output $$\overline{C}^T_n$$

indicating that the binary value of both binary bits is binary 0. Certain outputs of AND circuits 101 and 102 are applied to an OR circuit 105, an inverter 106 and an inverter 107 to produce various voltage levels indicative of certain of the function signals. In the same manner, the outputs of AND circuits 103 and 104 are applied to an OR circuit 108, an inverter 109 and an inverter 110. The various positive and negative levels indicative of a transmitted carry signal $$C^T_n$$

or a transmitted no-carry signal $$\overline{C}^T_n$$

are also utilized to generate a third signal labeled $M_n$ or $\overline{M}_n$. As mentioned previously, the designation $\overline{M}_n$ is indicative of the fact that the two binary bits applied to the adder stage are of different values. The designation $M_n$ is indicative of the fact that the binary value of the two bits applied to the adder stage are of the same value.

Certain of the outputs from the function generator FG are applied to the carry transmission logic CTL comprised of AND circuits 111, 112, 113, and 114. It will be the function of AND circuits 111 and 112 to cause the associated driver 24 connected to the coupler 22 to cause a pulse to be placed on the transmission line 20 when either position $n$ or position $n+1$ is to produce a carry signal $$(C^T_{n,n+1})$$

AND circuits 113 and 114 will be operative to energize the associated driver 24 to cause the associated coupler 22 to place on the transmission line 21 a pulse indicative of a transmitted no-carry signal $$(\overline{C}^T_{n,n+1})$$

As mentioned earlier, a part of the present invention is the interconnection of function generators with the carry transmission logic to inhibit a lower order adder stage from transmitting carry or no-carry information if an immediately preceding higher order stage will be transmitting carry or no-carry signals. Therefore, each of the AND circuits 111 through 114 is normally inoperative and ineffective to energize the driver unless the signals $\overline{M}_{n+2}$ and $\overline{M}_{n+3}$ are present from the immediately succeeding higher order function generator. In a like manner, AND circuits 111 and 113 which receive as one input the carry or no-carry function signals from position $n$ are also ineffective unless the $\overline{M}_{n+1}$ signal is present from the $n+1$ position of the function generator FG.

The Latch Set LS is comprised of AND circuits 115 and 116, provided in order to produce carry information to the next higher order pair of bits whenever AND circuits 111 through 114 have been prevented from operating because the function generator associated with the higher order bit pair has been called upon to transmit carry or no-carry information. The transmission of a carry signal or a no-carry signal from position $n+1$ is applied directly at the output of AND circuits 115 and 116 respectively. The two inputs to the AND circuits 115 and 116 will represent the need for generating a carry or no-carry signal respectively to position $n+2$ whenever position $n$ is called upon to transmit a carry signal or a no-carry signal and position $n+1$ has produced $\overline{M}_{n+1}$ indicative of a carry propagate situation. The outputs of AND circuits 115 and 116 are the carry information to be received by stage $n+2$ and are labeled $$C^R_{n+2} \text{ and } \overline{C}^R_{n+2}$$

respectively.

In FIGURE 6*b*, an extension of the transmission lines 20 and 21 is shown. The received carry latch RCL, associated with bit positions $n+2$ and $n+3$, includes a first latch comprised of an OR circuit 117 and an AND circuit 118 and a second latch circuit comprised of an OR circuit 119 and an AND circuit 120. The combination of OR circuit 117 and AND circuit 118, for example, is such that when the latch is in the reset condition and a positive signal is applied to OR circuit 117 in the form of a set signal, the output of OR circuit 117 will change making both inputs to AND circuit 118 negative thereby affecting the output of AND circuit 118 to provide a positive level at the input of OR circuit 117. This cross connection therefore causes the OR circuit 117 and AND circuit 118 to reverse their output conditions and hold this condition until a positive reset signal is applied to AND circuit 118. One set input to OR circuit 117 can be provided from an AND circuit 121. In a like manner, one set input to OR circuit 119 can be produced by an AND circuit 122. When both the first and second latch combinations are in the reset condition, AND circuits 121 and 122 are conditioned to produce an output pulse when a negative input is received from either the transmission line 20 or transmission line 21 respectively. It will be the function of the received carry signalling means RC, to detect and indicate the first to be received of a negative pulse on either transmission line 20 or 21 and reject any immediately following pulses. For example, if a negative pulse is detected on transmission line 20, this negative pulse will be effective at AND circuit 121 to complete the AND condition to produce a positive output on line 123, stretched by the output of a delay element 124, to OR circuit 117. The outputs of OR circuit 117 will shift condition to be effective at AND circuit 118 to shift its output condition to thereby maintain a positive input to OR circuit 117. The output of AND circuit 121 which rises to a positive level in response to the negative input pulse, is applied as one input to AND circuit 122. Another input to AND circuit 122 comes from OR circuit 117. The output of AND circuit 121 will inhibit any operation of AND circuit 122 for the duration of the input pulse to AND circuit 121 until such time as the latch combination of OR circuit 117 and AND 118 has shifted to thereby provide a disabling input to AND circuit 122 from the latch output. The same inter-connection will be effective if the first pulse to be received occurs on transmission line 21 which would then be effective at AND circuit 122 to set the latch combination of OR circuit 119 and AND circuit 120 thereby inhibiting the operation of AND circuit 121. Therefore the receive carry signalling means will be effective when in the reset condition to recognizez the first pulse received on either transmission line 20 or 21 and prevent the detection of a following pulse on either transmission line 20 or 21.

An additional set input to OR circuit 117 is provided from AND circuit 115 from FIGURE 6*a* and an additional set input to OR circuit 119 comes from AND circuit 116 in FIGURE 6*a*. This then provides the receive carry signalling means with an alternate carry input from a next preceding lower order stage when that stage has been inhibited from placing pulses on transmission line 20 or 21 through the operation of the function generator associated with positions $n+2$ and $n+3$.

The output of OR circuits 117 and 119 provides the receive carry or receive no-carry signals for the parallel adder position $n+2$. A receive carry or receive no-carry signal for utilization by stage $n+3$ is a function of the output of AND circuits 125 and 126 and OR circuits 127 and 128. The combination of the receive carry $$C^R_{n+2} \text{ or receive no-carry } \overline{C}^R_{n+2}$$

signals for position $n+2$ combined with $n+2$ position function generator signals $M_{n+2}$ and $\overline{M}_{n+2}$ provide the received carry $$C^R_{n+3} \text{ or receive no-carry } \overline{C}^R_{n+3}$$

information for the sum generator associated with position $n+3$.

The sum generator for position $n+2$ (SGL) is comprised of AND circuits 129, 130, 131, and 132. The sum generator for position $n+3$ (SGH) is comprised of AND circuits 133, 134, 135, and 136. A positive binary 1 result for the sum $S_{n+2}$ will be provided when any of the AND circuits 129 through 132 produce a positive output in response to the necessary inputs. The required inputs for each of these AND circuits to produce a sum of "1" is readily apparent from examination of the FIGURE 6*b*. The same holds true for position $n+3$ where a binary 1 will be signalled as the sum $S_{n+3}$ when the necessary inputs to any of the AND circuits 133 through 136 is satisfied. An example of the operation of the final sum generation can be seen with AND circuit 130. When the function generator produces a signal indicative of the fact that the two binary input bits were the same ($M_{n+2}$) the sum would be a binary 0 unless the position received a carry in which will be signalled by OR circuit 117 in response to a received carry signal $$C^R_{n+2}$$

AND circuit 131 will produce a positive binary 1 output when the binary bits in position $n+2$ applied to the function generator were different $\overline{M}_{n+2}$ and there was a received no-carry signal $$\overline{C}^R_{n+2}$$

AND circuits 129 and 132 are effective to produce the final sum output, taking into account carry look-ahead information into the section of the adder containing position $n+2$ or $n+3$. The final sum of a particular bit position, for example $n+2$, can only be affected by carry look-ahead information if the position $n+2$ has not received either carry or no-carry signals indicated by the fact that the Received Carry Latch has remained in the reset condition. This indicates that all lower order positions in the section had a bit combination of 1, 0 necessitating the propagation of any carries into the section through these positions.

FIGURES 6*a* and 6*b* show the standard inter-connection of various logic blocks making up four adjacent positions of a parallel binary adder in accordance with the present invention. By taking into account that the basic add time is to be calculated based on 7 logic levels plus the time to propagate a pulse the length of the transmission line for each section, certain modifications can be made, or must be made in certain positions of the adder for compatability purposes. FIGURES 7 shows a slight modification required in the carry transmission logic associated with the 2 lowest order bit positions of the parallel binary adder. The carry transmission logic is comprised of AND circuit 140 through AND circuit 145. And circuits 140, 141, 143, and 144 will produce a transmitted carry signal $$C^T_{1,2} \text{ or transmitted no-carry signal } \overline{C}^T_{1,2}$$

based on the outputs of the function generator receiving bit positions 1 and 2 plus the inhibiting action by the function generator receiving bit positions 3 and 4. AND circuit 142 is provided to affect the generation of a transmitted carry signal $$C_{1,2}$$

in response to a carry in signal C in from the data processing system. AND circuit 142 is effective to produce a transmitted carry signal $$C^T_{1,2}$$

in response to a carry in C in to the lowest order position of the binary adder when the first 4 lowest order bit positions are all in the 1, 0 bit combination. In a like manner, AND circuit 145 will be effective to produce a transmitted no-carry signal $$\overline{C}^T_{1,2}$$

in response to the absence of a carry in signal $\overline{C}$ in when all of the 4 lowest order bit positions are in the 1, 0 combination.

FIGURE 8 shows the modifications which can be made in the first 4 lowest order bit positions of the adder eliminating the need for a latch set or received carry latch means for positions 3 and 4. Since the minimum time required to complete the entire add operation for the adder requires 7 levels of binary logic plus the time required to propagate a signal from the lowest position of each section to the highest position of each section, modifications can be made to the sum generation of the first 4 bit positions. In effect, the first 4 bit positions are made to appear as a ripple carry type adder in which the sum output of position 4($S_4$), time-wise, is dependent upon 3 levels of logic including two levels of logic within the function generator for position $S_4$ plus three logic levels through positions $S_1$, $S_2$ and $S_3$. A detailed discussion of the manner of generating the sums $S_1$ through $S_4$ will not be described in detail because it is considered evident from an examination of the labeled inputs shown in FIGURE 8. One additional term used for labeling output lines in FIGURE 8, not previously discussed, is the designation $+$ NOT $C^R_2$ indicating that the signal line will be positive when a received carry signal $C^R_2$ is not received. The remainder of the inputs and outputs have been labeled in the manner previously discussed in connection with the various function signals.

FIGURE 9 represents another slight modification from the normal logic to accommodate time considerations. In FIGURE 6*b*, the received carry $C^R_{n+3}$ or received no-carry $\overline{C}^R_{n+3}$ information for position $n+3$ is shown to be generated through two levels of binary logic. The two levels of binary logic can be tolerated in lower order positions of each of the sections making up a total parallel adder because propagation of pulses along the transmission lines to higher orders takes a certain amount of time. However, the two highest order bit pair groups of each section, with the exception of the lowest order section, must have the $n+3$ received carry information produced through a single level of logic. In FIGURE 9, a single level of logic is provided and includes a plurality of OR circuits 150 through 155 and AND circuits 156 and 157, provided to receive true and complementary inputs from the function generator of position 29 and the received carry and no-carry signals for position 29 to enable the generation of true and complementary received carry $C^R_{30}$ and received no-carry $\overline{C}^R_{30}$ for position 30. This has been represented in particular for the binary position 30 of a 32-bit parallel binary adder. The same logic would be utilized for position 32 of the adder and the two highest order groups from any additional sections.

FIGURE 10 depicts the carry look-ahead inter-connection of a 64-bit parallel binary adder comprised of four 16-bit sections. Each of the sections 1 through 3 will have an associated Received Carry Latch 159, 259 and 359 respectively which correspond to the received carry latch 59 shown in FIGURE 5*a*. For example, latch 159 associated with Section 1 will produce either a received carry $C^R_{S1}$ signal or a received no-carry $\overline{C}^R_{S1}$ signal which will have been produced either from the highest order bit position of the section or from the transmission lines 20 or 21 respectively. Each of the sections with the exception of the lowest order section will have associated therewith Carry Look-Ahead logic 290, 390, and 490 respectively corresponding to the Look-Ahead Logic 90 shown in FIGURE 5*a*. The carry look-ahead logic associated with a particular section will receive inputs from the received carry latches associated with all lower order sections than the carry look-ahead logic in question. For example, Carry Look-Ahead logic 490 associated with Section 4 receives as inputs the received carry or received no-carry signals from latches 159, 259, and 359. The output of the Carry Look-Ahead logic 490 will then be applied simultaneously to all sum generators contained in Section 4. Since each of the Sections 1 through 3 will produce the received carry or received no-carry signals at substantially the same time, all of the carry look-ahead information applied to Sections 2, 3 and 4 will be applied to all sum generators in these sections at substantially the same time to produce a final sum output taking into account carries between the sections.

FIGURE 11 shows the binary logic utilized for generating the carry look-ahead CLA or not-carry look-ahead NOT CLA signals from each of the carry look-ahead blocks 290, 390, and 490 shown in FIGURE 10. For example, the OR circuits 291 and 292 would be contained in the Carry Look-Ahead block 290 of FIGURE 10. In a like manner, OR circuits 391 and 392 and AND circuits 393 and 394 would be contained in the Carry Look-Ahead block 390 of FIGURE 10 to produce the necessary carry look-ahead CLA3 or not-carry look-ahead NOT CLA3 information for Section 3 in response to received carry or received no-carry signals from Sections 1 and 2. OR circuits 491 and 492 and AND circuits 493 through 496 will be within Carry Look-Ahead block 490 of FIGURE 10 to produce carry look-ahead CLA4 or not-carry look-ahead NOT CLA4 information for Section 4 in response to the received carry or received no-carry signals from the preceding 3 sections.

There has thus been shown in the preceding description, a parallel binary adder utilizing transmission lines for the transmission of carry and no-carry signals, much like a carry completion adder. This eliminates the two stages of binary logic for each position of the adder normally required in this type of adder thereby further increasing the speed at which carry information is handled within the adder. For a given circuit technology or speed of logic block operation, the separation of directional couplers along the transmission line would have to be such as to insure that the generation of signals on the transmission line from two adjacent stages would not produce pulses so close together as to be indistinguishable by following logic. In accordance with a preferred embodiment of the present invention which causes a higher order position of the adder to control the transmission of carry or no-carry signals from a next lower order position, the minimum separation distance along the transmission line between directional couplers has been reduced. Without this modification, in accordance with the present invention, an unduly long transmission line would be required to permit the necessary separation between directional couplers. Therefore, for a given circuit technology utilized in making each of the logic blocks, and a consideration of the amount of logic to be utilized in building the entire parallel adder, the preferred embodiment of the present invention appears to be the best design. However, the technique still extends to the concept as originally described in connection with FIGURE 3 which has as its essence the removal of the two logic stages in the carry and no-carry signal path for each stage of the adder.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A binary adder comprising:

a plurality of logical function generators each receiving corresponding binary bits of two plural-bit binary operands to be added, each of said function generators including first, second and third outputs, the first being indicative of a transmitted carry (1, 1), the second of a transmitted no-carry (0, 0), and the third of a carry propagate (1, 0) designating the absence of either said first or second signal;

a first and a second transmission line;

carry transmitting means connected and responsive to a corresponding one of said function generators, with the exception of the highest order function generator, including first and second directional couplers for transmitting said first or second function signals toward higher order binary positions of the adder on said first and second transmission lines respectively;

a plurality of received carry signalling means, including signal responsive means connected to said first and said second transmission lines for indicating that the first detected pulse on said first or said second transmission line was either a received carry signal or no-carry signal from a lower order position of the adder;

and a plurality of sum generating means, connected and responsive to outputs from a corresponding one of said function generators, and a corresponding one of said received carry signalling means for generating a plural-bit binary sum of the applied operands.

2. A binary adder in accordance with claim 1 wherein: each of said carry transmitting means includes, normally inoperative logic means associated with each of said directional couplers, connected and responsive to said third output from the immediately succeeding higher order one of said function generators for enabling the operation of said couplers;

and said received carry signalling means further includes, means connected and responsive to the immediately preceding lower-order one of said function generators for indicating receipt of either said first or second function generator output.

3. A binary adder having a plurality of sections, each of said sections being comprised of apparatus in accordance with claim 1, wherein there is further provided:

a final received carry signalling means, associated with each of said sections, connected and responsive to the first to be received of said first or second function signals from either said first or second transmission line respectively or from said first or second output of said highest order function generator, for producing outputs to higher order sections of the adder indicative of carry or no-carry signals;

carry look-ahead signalling means associated with each section except the lowest order section, connected and responsive to said carry or no-carry signals from all preceding lower order sections for producing a carry look-ahead signal output;

and wherein all of said sum generators in each of said sections except said lowest order section include, means connected and responsive to said associated carry look-ahead signal generator for generating an output sum taking into account a carry into the section.

4. A binary adder in accordance with claim 1 wherein:

each of said function generators includes, means for receiving a group comprised of two binary bits from each operand to be added for producing a signal on first, second, or third outputs for each bit position;

said carry transmitting means includes, first logic means connected to and effective to energize said first or second directional couplers in response to a first or second output signal respectively from the highest order bit of said two bits received by said function generator, second logic means connected to and effective to energize said first or second directional couplers in response to said third output signal associated with the highest order bit of said two bits received and said first or second output signal respectively from the lowest order bit of said two bits received by said function generator;

and said received carry signalling means associated with the highest order one of said two bits includes, means connected and responsive to said first, second, and third output signals from said function generator and said received carry or no-carry signal indications from said carry signalling means associated with the low order bit of said two bits.

5. A binary adder in accordance with claim 4 wherein:

said first and said second logic means further include, means connecting said logic means to said third output associated with said two bits received by said next higher order function generator, operative to disable said first and second logic means in the absence of said third output signals associated with both of said two higher order bits;

and said received carry signalling means associated with the lowest order bit of said two bits received by a function generator includes, means connected and responsive to the immediately preceding lower order one of said function generators for indicating the presence and receipt of either said first or second outputs.

6. An adder in accordance with claim 1 wherein:

said received carry signalling means includes;

a first and a second latch circuit, each said latch circuit having a set input, a first gating circuit having an input connected to said first transmission line and an output connected to the set input of said first latch, a second gating circuit having an input connected to said second transmission line and an output connected to the set input of said second latch, and means connecting the output of each of said latches to an input of said gating circuit of the other of said latches, whereby said first and second gating circuits are rendered ineffective to set the corresponding one of said latches if the other of said latches has been previously set.

7. An adder in accordance with claim 6 wherein:

said received carry signalling means further includes;

additional set input means for said first and said second latch circuits, and means connecting said additional set input means of said first and said second latch circuits to said first and second outputs respectively from the preceding lower order one of said function generators;

and said carry transmitting means further includes, normally inoperative logic means, associated with each of said directional couplers, connected and responsive to said third output from the immediately succeeding higher order one of said function generators for enabling the operation of said couplers.

8. A binary adder in accordance with claim 1 wherein there is further provided:

input carry signalling means for indicating the presence or absence of a carry into the lowest order position of said adder, and wherein said carry transmitting means associated with said lowest order function generator includes, means connected and responsive to said third output for energizing said first or said second directional coupler in response to the presence or absence respectively of a carry-in signal from said input carry signalling means.

References Cited

UNITED STATES PATENTS 3,081,032 3/1963 Keir et al. ---------- 235—175

OTHER REFERENCES

Adder Circuit, O. J. Bedrij, IBM Technical Disclosure Bulletin, vol. 4, No. 3, August 1961, pp. 36–39.

High-Speed Arithmetic in Binary Computers by O. L. MacSorley in Proceedings of the IRE, vol. 49, No. 1, pp. 67–71.

MALCOLM A. MORRISON, *Primary Examiner.*

V. SIBER, *Assistant Examiner.*